(12) United States Patent
Yuan

(10) Patent No.: US 6,550,353 B2
(45) Date of Patent: Apr. 22, 2003

(54) GEARED DRIVE RING COUPLER

(75) Inventor: Jing Yuan, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/851,043

(22) Filed: May 8, 2001

(65) Prior Publication Data

US 2001/0053723 A1 Dec. 20, 2001

Related U.S. Application Data

(60) Provisional application No. 60/210,138, filed on Jun. 7, 2000.

(51) Int. Cl.$^7$ ................................................. F16H 1/14
(52) U.S. Cl. ........................................ 74/417; 74/412 R
(58) Field of Search ........................... 74/416, 417, 410, 74/421 R, 421 A; 476/34, 53, 55

(56) References Cited

U.S. PATENT DOCUMENTS

| | | | | |
|---|---|---|---|---|
| 865,958 A | * | 9/1907 | Stanfield .................... 74/421 R |
| 1,742,385 A | * | 1/1930 | Flanders ....................... 74/410 |
| 2,608,872 A | * | 9/1952 | Larson .......................... 476/55 |
| 3,192,790 A | * | 7/1965 | Endress ......................... 74/410 |
| 3,572,145 A | | 3/1971 | Sporck .......................... 74/192 |
| 3,722,305 A | | 3/1973 | Walters et al. .............. 74/125.5 |
| 4,326,431 A | | 4/1982 | Stephenson ..................... 74/63 |
| 4,875,894 A | | 10/1989 | Clark ........................... 474/49 |
| 5,142,942 A | * | 9/1992 | Fukaya ......................... 180/6.2 |
| 5,709,624 A | | 1/1998 | Donowski ....................... 474/8 |
| 5,860,320 A | * | 1/1999 | Crabb .......................... 74/112 |

\* cited by examiner

Primary Examiner—David Fenstermacher
(74) Attorney, Agent, or Firm—J. A. Thurnau, Esq.; C. H. Castleman, Esq.; S. G. Austin, Esq.

(57) ABSTRACT

The invention comprises a geared drive ring coupler. The geared drive ring coupler comprises two pairs of adjacent drive rings rotatably connected to each end of a frame. Each pair of drive rings is meshed together with the cooperating pair of drive rings on the opposing end of the frame. The relative spatial arrangement of the axis of rotation of each set of drive rings is maintained by the frame, which in turn holds the drive rings in a predetermined relationship between the pulley sheaves. The drive rings on the driver pulley turn in the same direction as the driver pulley through frictional contact with the sides of the CVT driver pulley sheaves. The drive rings on the driven pulley side rotate in the opposite direction to the drive rings on the driver pulley, since they are meshed together. The driven drive rings are then in frictional contact with the sides of the driven pulley sheaves, thereby driving the driven pulley. The effective diameter or radius of each pulley is adjusted by movement of the pulley sheaves. Movement of the pulley sheaves causes the axis of rotation of each set of drive rings to move eccentrically with respect to the axis of rotation of their respective pulley. Since the drive rings are mechanically connected, the drive rings move with the frame as a unit in response to the movement of the pulley sheaves, thereby changing the effective gear ratio of the transmission.

19 Claims, 4 Drawing Sheets

GEARED DRIVE RING COUPLER

REFERENCE TO RELATED APPLICATIONS

This application claims priority from U.S. application No. 60/210,138 filed Jun. 7, 2000.

FIELD OF THE INVENTION

The invention relates to geared power transmission systems, and more particularly, to geared drive ring couplers comprising drive rings that cooperate with a driver and driven pulley on a CVT transmission and wherein the drive rings mesh together and are connected by a bearing frame.

BACKGROUND OF THE INVENTION

It is well known in the art that a gear type transmission may be used for operating a motor vehicle, motorcycle or the like. The transmission connects the motor to the drive wheels. Transmissions generally comprise a finite number of gears, usually three or four. Only one of the gears is most efficient, so operating the motor in one of the other gears necessarily reduces efficiency. For the purposes of improving fuel efficiency, a continuously variable transmission, or CVT, is preferable.

A CVT is infinitely variable so a wide range of gear ratios is made available as compared to a gear type transmission. The CVT transmission generally comprises a driver and driven pulley. The pulleys are connected by a belt trained around each. Various types of belts have been developed for use in continuously variable transmissions.

Generally, the CVT Belts have a silhouette similar to that of a conventional V-belt. In particular, they are broad at the top and narrow at the bottom and designed to fit between the sheaves of the pulley that defines an angular groove. The pulley on which the belt is trained comprises a moveable sheave and a fixed sheave, both having a truncated cone shape. Generally, one of the sheaves moves while the other remains fixed.

Moving one sheave in relation to the other effectively varies the effective diameter, $\phi$, of the pulley within which the belt operates. Consequently, belt linear speed is a function of the effective diameter of the pulley which is in turn a function of the axial position of the sheaves relative to each other.

Although the prior art CVT belts are flexible, each also has characteristics not found in other power transmission belts. For example, the belts are required to have transverse rigidity. This allows the belt to run at a particular effective diameter without being crushed between the pulley sheaves.

A drive ring may be used in a variable diameter pulley to change an effective diameter. A belt is then trained over the drive ring.

Regarding the prior art relationship between the pulley and the belt, U.S. Pat. No. 5,709,624 to Donowski discloses a variable diameter pulley. A single drive ring runs in the sheaves of the pulley. A flexible belt runs on the drive ring through the pulley. As the sheaves move with respect to each other, the effective diameter of the pulley is changed. Since the drive ring bears the transverse or compressive forces between the sheaves, the belt need not be designed to accommodate these forces. However, the Donowski device comprises a single drive ring used as a part of an auxiliary drive system of an internal combustion engine. A stabilizing member is also required to maintain the axis of rotation of the drive ring as least substantially parallel to the axis of rotation of the sheave members. The Donowski device does not lend itself to use in a CVT transmission.

Also representative of the prior art is U.S. Pat. No. 4,875,894 to Clark, which discloses a continuously variable transmission. The transmission comprises an input and output shaft, each having a rotary disk assembly. The rotary disk assemblies each have contact pads that form circles having continuously variable diameters. The two rotary disk assemblies are connected by a coupling mechanism, such as a single rigid coupling ring. Power transmission occurs between each pulley through rotation of the ring. This device does not offer the option of using flexible belts for power transmission, requiring instead the rigid ring to connect the two disks. This limits the space that the device can operate within, generally to a square or circular space defined by the extreme outer dimension of the pulleys.

What is needed is a geared drive ring coupler having co-operating drive rings that transmit power by gear interaction. What is needed is a geared drive ring coupler that has a frame for mechanically connecting and spatially orienting the drive rings. The present invention meets these needs.

SUMMARY OF THE INVENTION

The primary aspect of the invention is to provide a geared drive ring coupler having cooperating drive rings that transmit power by gear interaction.

Another aspect of the invention is to provide a geared drive ring coupler that has a frame for mechanically connecting and spatially orienting the drive rings.

Other aspects of the invention will be pointed out or made obvious by the following description of the invention and the accompanying drawings.

The invention comprises a geared drive ring coupler. The geared drive ring coupler comprises two pairs of adjacent drive rings rotatably connected to each end of a frame. Each pair of drive rings is meshed together with the cooperating pair of drive rings on the opposing end of the frame. The relative spatial arrangement of the axis of rotation of each set of drive rings is maintained by the frame, which in turn holds the drive rings in a predetermined relationship between the pulley sheaves. The drive rings on the driver pulley turn in the same direction as the driver pulley through frictional contact with the sides of the CVT driver pulley sheaves. The drive rings on the driven pulley side rotate in the opposite direction to the drive rings on the driver pulley, since they are meshed together. The driven drive rings are then in frictional contact with the sides of the driven pulley sheaves, thereby driving the driven pulley. The effective diameter or radius of each pulley is adjusted by movement of the pulley sheaves. Movement of the pulley sheaves causes the axis of rotation of each set of drive rings to move eccentrically with respect to the axis of rotation of their respective pulley. Since the drive rings are mechanically connected, the drive rings move with the frame as a unit in response to the movement of the pulley sheaves, thereby changing the effective gear ratio of the transmission.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
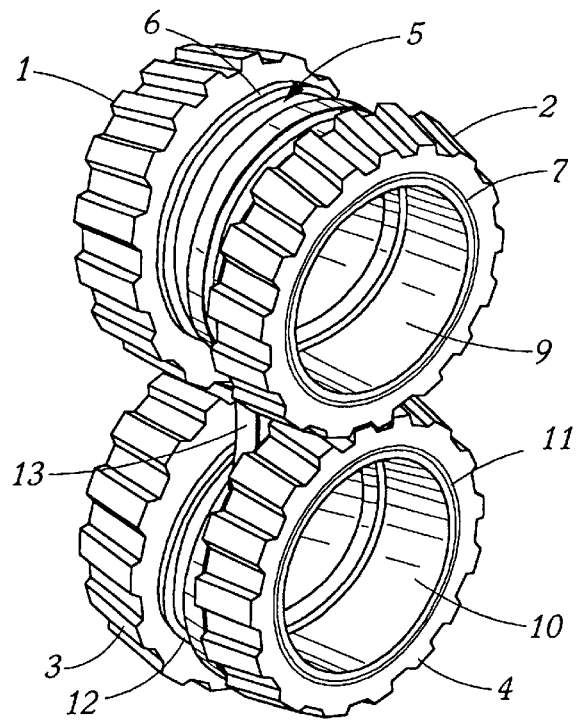
FIG. 1 is a perspective view of the invention.

FIG. 1 is a perspective view of the invention. The geared drive ring CVT comprises rings 1, 2, 3, and 4. Rings 1, 2 are rotatably coupled to rings 3, 4 respectively by meshing or gear surfaces.

The rings or ring gears are rotatably mounted to frame 5. Frame 5 comprises bearing retainer 9 and 10 at each end respectively. Bearings 6, 7 are mounted to retainer 9 and bearings 11, 12 are mounted to retainer 10. Support 13 of frame 5 holds retainers 9 and 10 in proper relation. In turn, ring gear 1 is mounted upon bearing 6, ring gear 2 is mounted upon bearing 7, ring gear 3 is mounted upon bearing 12, and ring gear 4 is mounted upon bearing 11. Each ring 1, 2, 3, 4 has an axis of rotation. Bearings 6, 7 and 11, 12 may comprise any suitable bearing type known in the art, including but not limited to ball, needle or sleeve.

Figure 2:
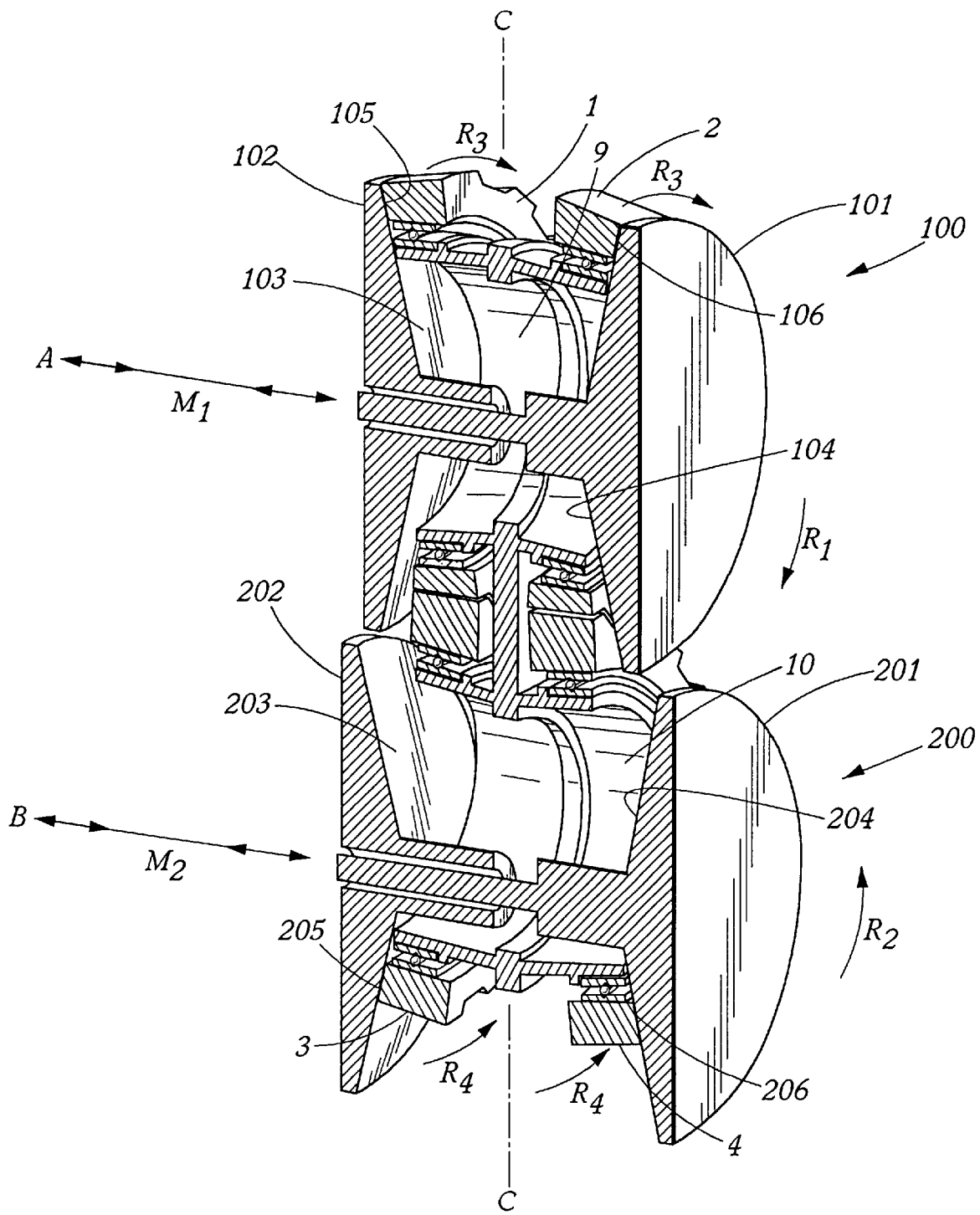
FIG. 2 is a cross-sectional perspective view of the geared drive ring coupler in the CVT pulleys.

FIG. 2 is a cross-sectional perspective view of the geared drive ring coupler in the CVT pulleys. The inventive system is shown installed between a driver pulley 100 and a driven pulley 200. Pulley sheaves 101, 102 move axially M1 in order to increase or decrease the spacing between the sheaves. Pulley sheaves 201, 202 move axially M2 in order to increase or decrease the spacing between the sheaves. In each case, each sheave moves cooperatively together or apart. Movement of the CVT pulley sheaves is accomplished by means known in the art. Movements M1 and M2 are made with respect to fixed axis C, meaning each sheave section moves toward or away from axis C an equal but opposite amount compared to its co-operating sheave section.

In operation, pulley 100 rotates in direction R1 and pulley 200 rotates in direction R2. The axis of pulley 100 projects through retainer 9. The axis of pulley 200 projects through retainer 10. Surface 33 of ring gear 1, see FIGS. 3, 4, bears on sheave surface 103 at 105. Surface 31 of ring gear 2, see FIGS. 3, 4, bears on sheave surface 104 at 106. This contact causes ring gears 1, 2 to rotate in direction R3 in concert with pulley 100. As ring gears 1, 2 rotate, they are meshed or rotatably coupled with ring gears 3, 4 respectively, thereby causing ring gears 3, 4 to rotate in direction R4. Surface 34 of ring gear 3, see FIGS. 3, 4, bears on sheave surface 203 at 205. Surface 32 of ring gear 4, see FIGS. 3, 4, bears on sheave surface 204 at 206. This contact drives pulley 200 causing it to rotate in direction R2 in concert with and as driven by ring gears 3, 4. Surfaces 31, 32, 33, 34 each describe an angle to allow each to properly bear upon surface 104, 204, 103, 203 respectively.

It is known in the art that the effective radius of each ring of the geared drive ring CVT is determined by the relative position of the sheave sections. As the sheave sections of a given pulley move together, the effective radius will increase as the axis of rotation of the ring gears is forced to move away from the axis of rotation of the pulley. Conversely, as the sheave sections move apart, the effective radius will decrease as the rotational axis of the ring gears moves toward the axis of rotation of the pulley.

Figure 3:
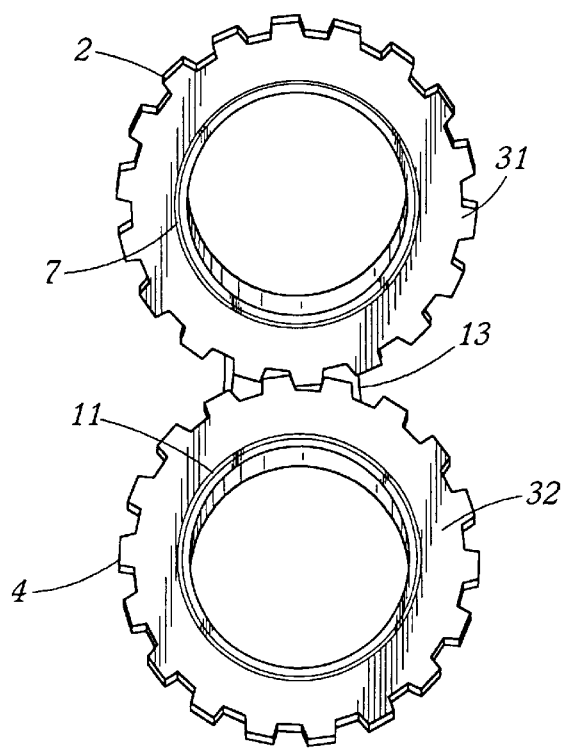
FIG. 3 is a side elevation view of the geared drive ring system.

FIG. 3 is a side elevation view of the geared drive ring coupler. Bearing surface 31 contacts a sheave surface 104, see FIG. 2. Bearing surface 32 contacts a sheave surface 204. Ring gear 2 runs on bearing 7. Ring gear 4 runs on bearing 11.

Figure 4:
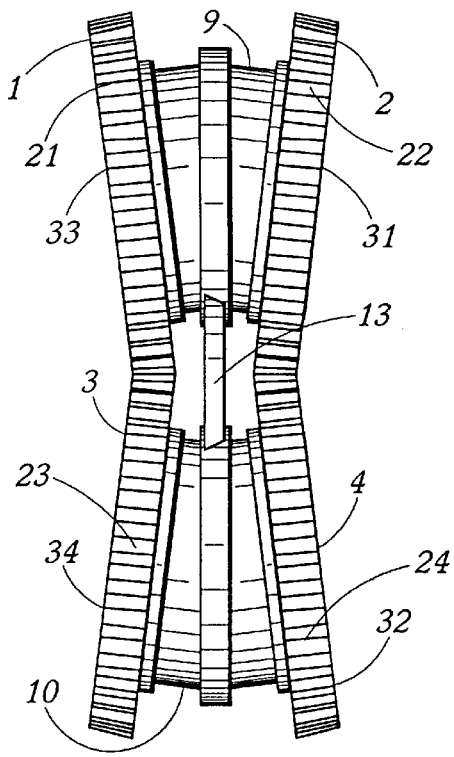
FIG. 4 is a top plan view of the geared drive ring system.

FIG. 4 is a top plan view of the geared drive ring coupler. Ring gear 1 comprises gear surface 21. Ring gear 2 comprises gear surface 22. Ring gear 3 comprises gear surface 23. Ring gear 4 comprises gear surface 24. Support 13 fixedly connects retainer 9 to retainer 10, thereby holding ring gears 1, 2 in proper meshed relation with ring gears 3, 4 respectively. Surfaces 21, 22, 23, and 24 may comprise any gear profile known in the art, including but not limited to helical, spur, or bevel.

In an alternate embodiment, surfaces 21, 22, 23, 24 are flat. In this alternate embodiment, the rotatably coupled ring surfaces transmit power by way of a high friction co-efficient on each surface.

Figure 5:
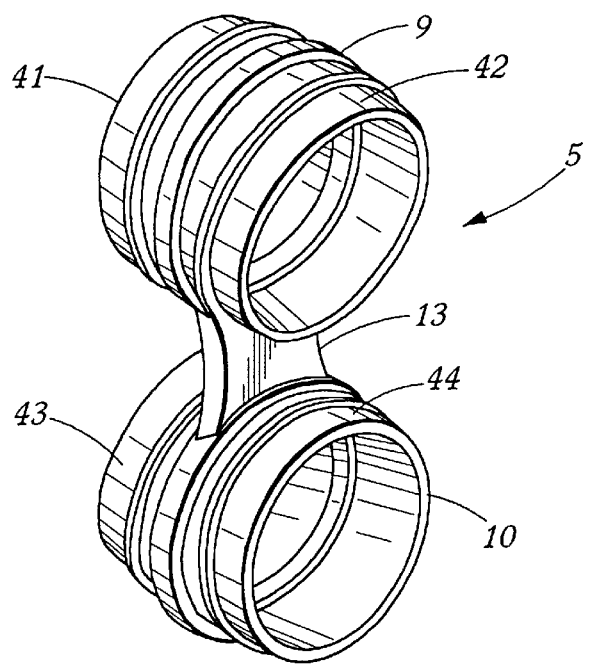
FIG. 5 is a perspective view of the bearing frame.

FIG. 5 is a perspective view of the bearing frame. Frame 5 comprises retainer 9 and retainer 10 fixedly connected by support 13. Retainer 9 comprises bearing mounting surfaces 41, 42 upon which bearings 6, 7 are mounted, respectively. Retainer 10 comprises bearing mounting surfaces 43, 44 upon which bearings 12, 11 are mounted, respectively.

Figure 6:
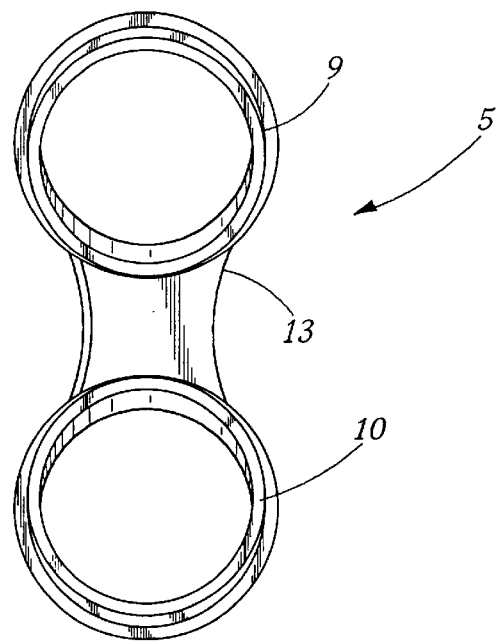
FIG. 6 is a side elevation view of the bearing frame.

FIG. 6 is a side elevation view of the bearing frame. Retainer 9 and retainer 10 are axially aligned with and connected to support 13.

Figure 7:
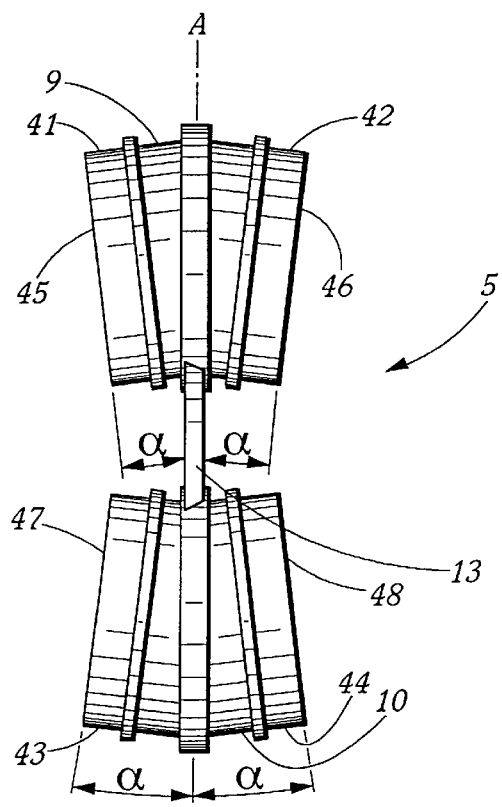
FIG. 7 is a top plan view of the bearing frame.

FIG. 7 is a top plan view of the bearing frame. Outer edge 45, 46 of retainer 9 describe an angle $\alpha$ to the major axis A. Outer edges 47, 48 of retainer 10 also describe an angle $\alpha$ to the major axis A. Angle $\alpha$ is slightly less than ½ the value of an included angle between the inner surfaces of a pulley sheave in which the coupler operates in order to assure the proper contact between the gear ring and pulley sheave. That is, this angled relationship assures proper contact at 105, 106 and 205, 206 as shown in FIG. 2. Angle $\alpha$ may be specified to accommodate the physical characteristics of a particular pulley.

Although a single form of the invention has been described herein, it will be obvious to those skilled in the art that variations may be made in the construction and relation of parts without departing from the spirit and scope of the invention described herein.

I claim:

1. A geared drive ring coupler comprising:

a first ring having a bearing surface;

a second ring having a bearing surface;

a third ring having a bearing surface;

a fourth ring having a bearing surface;

a frame having a first end and a second end having a frame major axis;

the first ring and the second ring each describe the same angle ($\alpha$) to the frame major axis;

the first ring and the second ring are rotatably mounted to the first end; and the third ring and the fourth ring are rotatably mounted to the second end.

2. The geared drive ring coupler as in claim 1, wherein:

the first ring is coupled to the third ring; and the second ring is coupled to the fourth ring.

3. The geared drive ring coupler as in claim 2, wherein:

the third ring bearing surface and the fourth ring bearing surface each describe an included angle.

4. The geared drive ring coupler as in claim 3, wherein:

the first ring and the second ring are adjacent to each other; and the third ring and the fourth ring are adjacent to each other.

5. The geared drive ring coupler as in claim 4, wherein;

the first ring and the third ring are coupled to each other by meshing surfaces; and the second ring and the fourth ring are coupled to each other by meshing surfaces.

6. The geared drive ring coupler as in claim 4, wherein;

the first ring and the third ring are coupled to each other by frictional surfaces; and the second ring and the fourth ring are coupled to each other by frictional surfaces.

7. A geared drive ring coupler comprising:

a frame having a first end and a second end having a frame major axis;

a first rotating member rotationally mounted to the first end;

the first rotating member having a first bearing surface;

a second rotating member rotationally mounted to the second end;

the second rotating member having a second bearing surface;

the first rotating member and the second rotating member describe the same angle (α) with respect to the frame major axis;

the first bearing surface and the second bearing surface describe an included angle;

the first rotating member and the second rotating member are coupled;

a third rotating member rotationally mounted to the first end and adjacent to the first rotating member;

a fourth rotating member rotationally mounted to the second end and adjacent to the second rotating member; and the third rotating member and the fourth rotating member are coupled.

8. The coupler as in claim 7, wherein:

the third rotating member further comprises a third bearing surface; and the fourth rotating member further comprises a fourth bearing surface.

9. The coupler as in claim 8, wherein:

the third bearing surface and the fourth bearing surface describe an included angle.

10. The coupler as in claim 9 wherein:

an axis of rotation of the first rotating member and an axis of rotation of the third rotating member describe an angle; and an axis of rotation of the second rotating member and an axis of rotation of the fourth rotating member describe an angle.

11. The geared drive ring coupler as in claim 10, wherein:

the first rotating member and the second rotating member are adjacent to each other; and the third rotating member and the fourth rotating member are adjacent to each other.

12. The geared drive ring coupler as in claim 11, wherein;

the first rotating member and the third rotating member are coupled to each other by meshing surfaces; and the second rotating member and the fourth rotating member are coupled to each other by meshing surfaces.

13. The geared drive ring coupler as in claim 11, wherein;

the first rotating member and the third rotating member are coupled to each other by frictional surfaces; and the second rotating member and the fourth rotating member are coupled to each other by frictional surfaces.

14. A geared drive ring coupler comprising:

a first ring having a bearing surface;

a second ring having a bearing surface;

a third ring having a bearing surface;

a fourth ring having a bearing surface;

a frame having a first end and a second end having a frame major axis;

the first ring and the third ring each describe the same angle (α) with respect to the frame major axis;

the first ring and the second ring are rotatably mounted to the first end;

the third ring and the fourth ring are rotatably mounted to the second end;

the first ring is coupled to the third ring; and the second ring is coupled to the fourth ring.

15. The geared drive ring coupler as in claim 14, wherein;

the first ring and the third ring are coupled to each other by meshing surfaces; and the second ring and the fourth ring are coupled to each other by meshing surfaces.

16. The geared drive ring coupler as in claim 14, wherein;

the first ring and the third ring are coupled to each other by frictional surfaces; and the second ring and the fourth ring are coupled to each other by frictional surfaces.

17. A geared drive ring coupler comprising:

a first member having a bearing surface;

a second member having a bearing surface;

a frame having a first end and a second end having a frame major axis;

the first member describing an angle (α) with respect to the frame major axis;

the second member describing the same angle (α) with respect to the frame major axis;

the first member rotatably mounted to the first end;

the second member rotatably mounted to the second end; and the first member coupled to the second member.

18. The coupler as in claim 17, wherein;

the first member and the second member are coupled to each other by meshing surfaces.

19. The coupler as in claim 17, wherein;

the first member and the second member are coupled to each other by frictional surfaces.

* * * * *